United States Patent [19]

Neudorfer

[11] Patent Number: 4,935,955
[45] Date of Patent: Jun. 19, 1990

[54] FACSIMILE PBX WITH STORAGE AND SECURITY

[76] Inventor: Julius N. Neudorfer, 21 Parkhill Ter., Dobbs Ferry, N.Y. 10522

[21] Appl. No.: 202,005

[22] Filed: Jun. 3, 1988

[51] Int. Cl.$^5$ .............................................. H04M 1/32
[52] U.S. Cl. .................................... 379/100; 379/95; 358/402; 358/407
[58] Field of Search ............................ 379/100, 93–95, 379/67, 88; 358/257, 400, 402, 403, 407

[56] References Cited

U.S. PATENT DOCUMENTS 4,491,873  1/1985  Takayama ........................... 358/256

Primary Examiner—Jin F. Ng
Assistant Examiner—Wing F. Chan
Attorney, Agent, or Firm—Ostrolenk, Faber, Gerb & Soffen

[57] ABSTRACT

A system for interfacing central office telephone lines with internal facsimile machines. Roll-over lines are employed that automatically sequence up from the main facsimile telephone number as more and more facsimile transmissions arrive. Incoming and outgoing facsimile transmission data is placed in memory storage after being received and before being transmitted. The combination of roll-over and memory storage makes the system transparent to the outside sender, since all incoming facsimile transmissions dial the same main telephone number. Similarly, outgoing messages are transparent to the facsimile machine operators inside the company, since their messages are sent to the interface unit, stored in memory and then sent out over the next free facsimile telephone line.

15 Claims, 3 Drawing Sheets

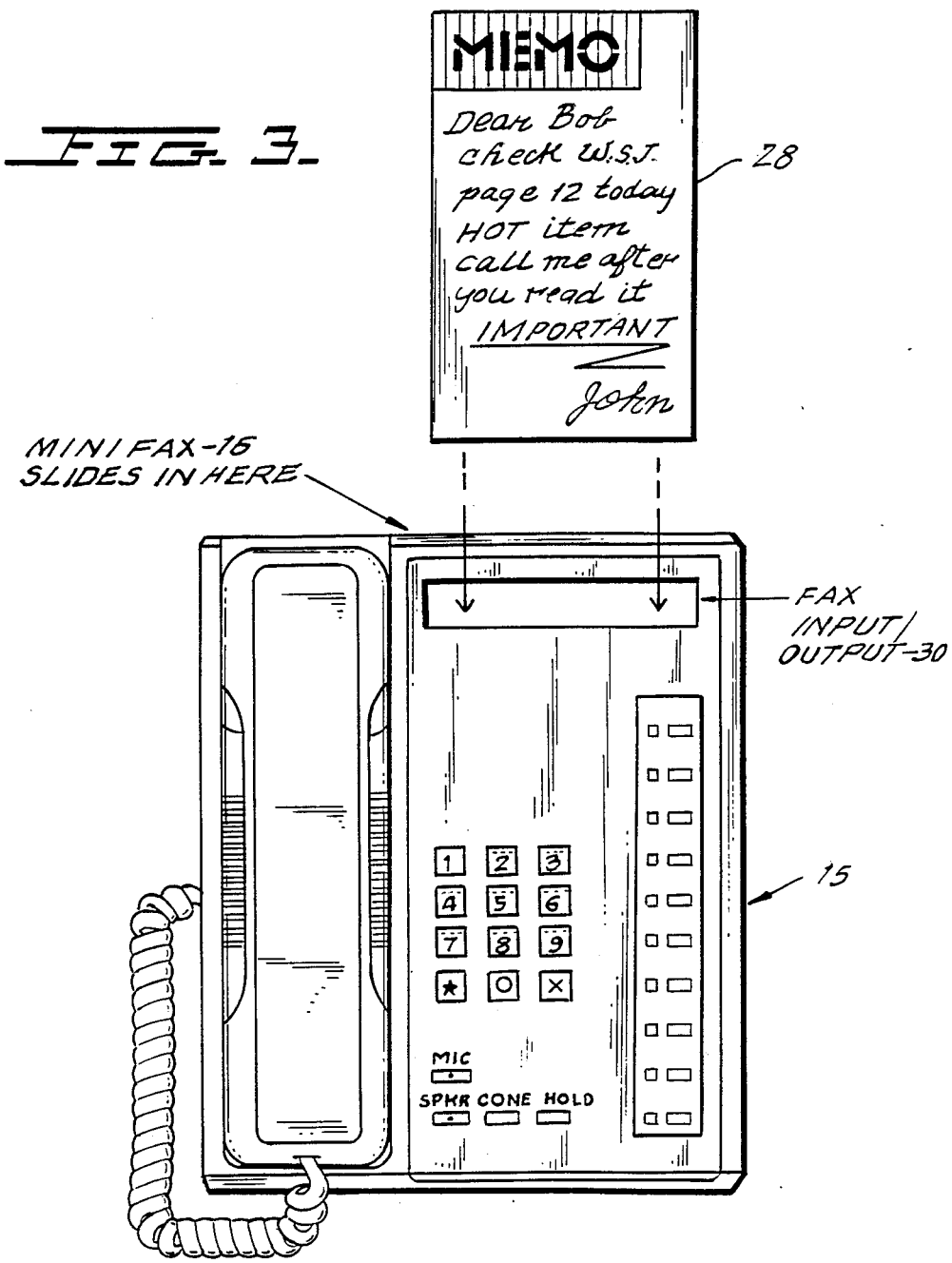

FACSIMILE PBX WITH STORAGE AND SECURITY

BACKGROUND OF THE INVENTION

1. Field of the Invention

The present invention relates to a facsimile system and, more specifically, to a system for interfacing between facsimile machines and facsimile telephone lines.

2. Description of the Related Art

Facsimile transmission of documents over electronic transmission lines has become increasingly prevalent in recent years. The attractiveness of facsimile transmission stems principally from its nearly instantaneous speed, as compared to at least a day or more for the physical delivery of documentary material.

With the expanded usage of facsimile, it has become commonplace for the sender of a facsimile transmission to receive a busy signal from the dialed facsimile telephone number, indicating that the facsimile machine at the other end is either sending or receiving another document, and is at least momentarily unavailable. Such a result partially defeats the advantage of instantaneous transmission.

To combat the problem of having a constantly "busy" facsimile line, many companies now have more than one facsimile telephone number. Such multiple independent line systems, however, are disadvantageous in that the sender must attempt to obtain a connection with each line until a free line is found. Such attempts waste time and often result in unnecessary telephone toll charges.

Another disadvantage of prior art multi-line systems is that they require the purchase and operation of a corresponding number of expensive facsimile machines. Thus, it has been impossible to date for a company with only one facsimile machine to both send and transmit messages simultaneously, although situations often arise in which such action would be desirable.

In order to help free up "busy" transmission lines, facsimile machines have been developed which contain an internal memory for storing a number of incoming and outgoing facsimile messages. With this type of machine, an outgoing message can be inputted, stored, and transmitted later during a "non-peak" period that evening. The storage of incoming messages is also desirable in that a temporary "out of paper" condition of the facsimile machine printer will not prevent messages from being received, and will thus avoid a backup of incoming calls. While this enhanced type of facsimile machine with memory is convenient and versatile, it is still limited in that only one facsimile message can be received or transmitted at a time. Accordingly, if more than one party wishes to transmit or receive on the facsimile telephone line at a particular moment, the line may still be busy.

SUMMARY OF THE INVENTION

The present invention overcomes the above-mentioned problems by providing a system for interfacing any number of facsimile telephone lines with any number of internal office facsimile machines. The invention advantageously utilizes rollover lines that automatically sequence up from the main facsimile telephone number as more and more facsimile transmissions come in. By employing this roll-over feature, the main facsimile telephone line will rarely, if ever, return a busy signal, as it is highly unlikely that all of the facsimile telephone lines will be occupied. The incoming facsimile transmission data is immediately placed in memory storage inside the interface unit. Thus, the incoming message can be received even if there is only one actual facsimile machine attached to the system, and even if it is in use (either sending or receiving). The combination of rollover and memory storage makes the system transparent to the outside sender, since all incoming facsimile transmissions dial the same main telephone number. Similarly, outgoing messages are transparent to the facsimile machine operators inside the company, since their messages are sent to the interface unit, stored in memory and then sent out over the next free facsimile telephone line. Thus, by buffering both ingoing and outgoing transmissions within the system, the interfacing network of the present invention makes far more effective use of facsimile lines and facsimile equipment.

In one embodiment of the invention, the system employs a security feature which allows only the authorized recipient of a message to access the incoming facsimile transmission. Access can be achieved by entering a password at the designated recipient's facsimile terminal, and only that particular facsimile transmission be accessed from the storage in the interface unit.

In another embodiment, the interface unit can also act as a clearance center for directing an incoming message from the central facsimile lines to the appropriate individual facsimile machines by using extension numbers appended onto a facsimile number.

In still another embodiment of the invention, the interface unit of the present invention can be used to network inexpensive facsimile machines for intra-office communication. The invention also allows inexpensive facsimile machines to be upgraded and used for high-speed external transmission, because even if the facsimile terminals are slow, the interface unit will convert the transmission to any higher speed format currently in use. Thus, the present invention enables companies to expand the usage of a main facsimile telephone number and continue to use existing original facsimile equipment.

These and other features and advantages of the invention are described below, with reference to the accompanying drawings.

BRIEF DESCRIPTION OF THE DRAWINGS

FIG. 3 is an illustration of a combination telephone/miniature facsimile unit that can be employed with the invention.

DETAILED DESCRIPTION OF THE PREFERRED EMBODIMENT

Figure 1:
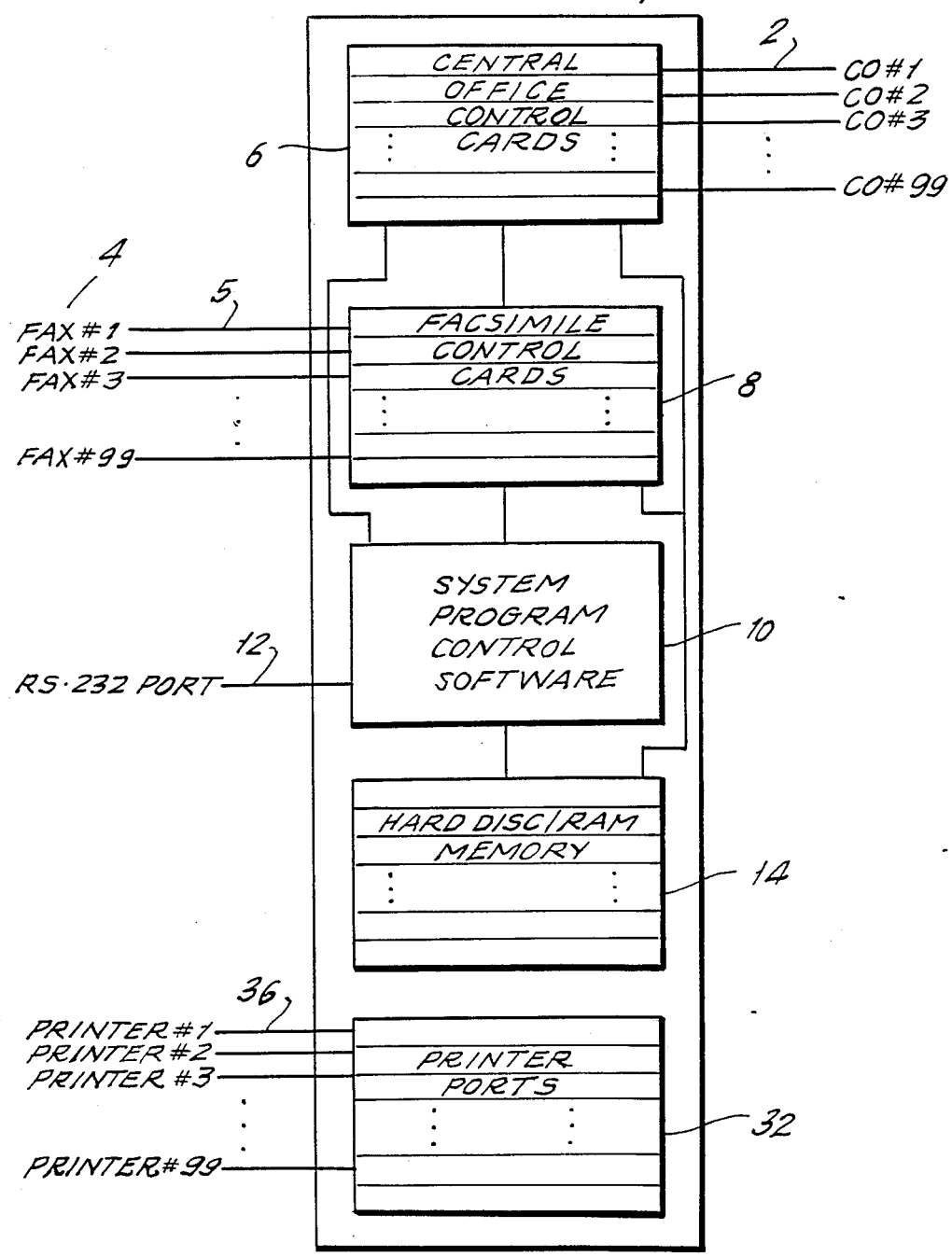
FIG. 1 is a detailed block diagram of the facsimile PBX unit of the present invention.

Referring first to FIG. 1, the facsimile PBX of the present invention, designated generally by reference numeral 1, is shown interfacing a plurality of central office telephone facsimile lines 2 with a plurality of internal facsimile machines 4. The central office telephone lines 2 are fed into central office control cards 6 housed in the facsimile PBX; similarly, the lines 5 from the facsimile units 4 are fed into facsimile control cards 8. In both cases, the design is modular; i.e., control cards may be added to increase the capacity of the system to handle a correspondingly increased number of central office facsimile telephone lines 2 and/or facsimile machines 4. The embodiment illustrated in FIG. 1 shows an exemplary system which can interface up to 99 central office telephone lines with up to 99 facsimile machines, but obviously control cards could be added or deleted to respectively increase or decrease the capacity of the system.

The control of the interfacing between the central office lines 2 and the facsimile units 4 is handled by microprocessors (not shown) built into the respective control cards. These microprocessors must be high powered units, preferably 32-bit machines such as the Motorola 68000 microprocessor. The microprocessors operate with cache memories (not shown) to provide the necessary high speed switching control.

Overall system control is coordinated by system program control software 10. An RS-232 port 12 is provided to reprogram system software 10 or to program the call routing security feature (discussed later).

Hard disk and/or electronic RAM memory 14 is provided for the actual storage of incoming and outgoing facsimile messages. If a number of facsimile machines and central office facsimile telephone lines are communicating at once, the amount of data to be stored in memory is massive. However, recent advances in memory technology make the invention feasible. In the preferred embodiment, multiple 100 MB hard disks are employed, each of which can store a large number of pages of facsimile communication. The design is modular, so that additional hard disks can be added to increase system capacity. Tape drive or removable hard disk units (not shown) are provided as a back-up for the memory. The system software will provide automatic archive to the back-up memory of any unpicked-up facsimile messages (along with a printed log sheet) after a predetermined fixed time interval (which is programmable, e.g. to every 24 hrs, 48 hrs, or 96 hrs.). Such archiving relieves the memory of "dead messages" and serves to remind those delinquent in message retrieval.

One of the primary features of the present invention is the implementation of roll-over central office facsimile telephone lines that automatically sequence up from the main facsimile number as more and more facsimile transmissions are received. In accordance with the present invention, the plurality of central office facsimile telephone lines 2 can all simultaneously be receiving facsimile transmissions that are all calling the same main facsimile telephone number. Each of these incoming facsimile transmissions is stored in memory 14. Thus, even if only one facsimile machine 4 is connected to the system, and even if that machine is in use either sending or receiving a facsimile transmission, a plurality of incoming facsimile messages can still be received over the plurality of central office facsimile telephone lines 2. The system is thus "transparent" to the outside sender of the facsimile message, since only a main facsimile telephone number is dialed.

The system is also "transparent" to the facsimile operator within the company, since he can send a facsimile message from his facsimile machine 4, and the system will "rollover" to find a free facsimile telephone line 2 line to send out the facsimile transmission. If all central office facsimile lines 2 are busy, outgoing facsimiles may be immediately accepted and stored in memory 14, thus freeing up the machine and the operator. The system is programmed to automatically wait for a free central office line 2 to become available, then dial the designated outside facsimile machine and transmit the previously stored message. If the outside facsimile machine is busy, the system will continuously retry to achieve connection until successful communication has been established. The facsimile operator can designate a message for immediate or delayed (night low rate) transmission. The facsimile PBX interface 1 can also be used to re-broadcast received messages to multiple outside or inside numbers. When sending facsimile transmissions to the outside world, the system is programmed to choose the long-distance company with the lowest rates for the particular call, just as present voice communication systems do.

The system also has a call routing security feature which allows only the intended or designated authorized recipient of a message to access a particular facsimile transmission from the PBX system. In accordance with this feature of the invention, a password is assigned to each person or department. Only when this password is entered by the designated recipient at his facsimile terminal, will his transmission be accessed from the system memory and printed out.

By employing an "extension"-type format, the system can be implemented to act as a clearance center for directing the incoming messages from the central facsimile lines 2 to the appropriate department's or individual's facsimile machine (similar to the way a company's mail room functions). The format could be {555-1000 "pause" 231}, the 231 representing the department or individual. This non-standard telephone number is usable, since the standard central office telephone system does not "see" after the last digit of a standard 555-1000 number is dialed, the 231 being sent after the "pause" by waiting for recognition of facsimile connect tone.

The system is modular in design, and can be expanded by simply adding more central office cards 6 or facsimile machine cards 8, each card being a complete facsimile interface into and out of to the system, thereby allowing expansion. As an example, the system may only be originally equipped for two facsimile machines 4 and six facsimile central office lines 2, but slots for one hundred facsimile machine cards 8 and one hundred central office line cards 6 are available in the preferred embodiment. Buffer memory 14 is also expandable using the same methodology.

Since the system is software controlled, it can be easily reprogrammed as new features are developed or customer desired restrictions are required. The system has the capability to receive standard ASCII data from computer modems and covert it directly to facsimile output (either from messages sent by internal computers or from messages received from incoming calls). The system can also interface with leased high speed data lines for remote office high volume traffic. In this mode, the system could totally replace the use of mail, because the per document cost would likely be less than mail, not to mention instantaneous.

The system is far more cost effective overall than stand alone multiple high performance machines directly connected to central office lines, since it allows the ability to "network" inexpensive facsimile machines for intraoffice internal use. The system also allows inexpensive machines to be upgraded far beyond today's most sophisticated machines for external communication as the system is reprogrammed and upgraded (as an example: even if the inexpensive machines use only a 4800 baud rate machine, the system automatically converts their transmissions to any higher speed format currently in use). Thus, the present invention allows companies that grow to continue to expand using the same facsimile telephone number and already existing original facsimile equipment.

Figure 2:
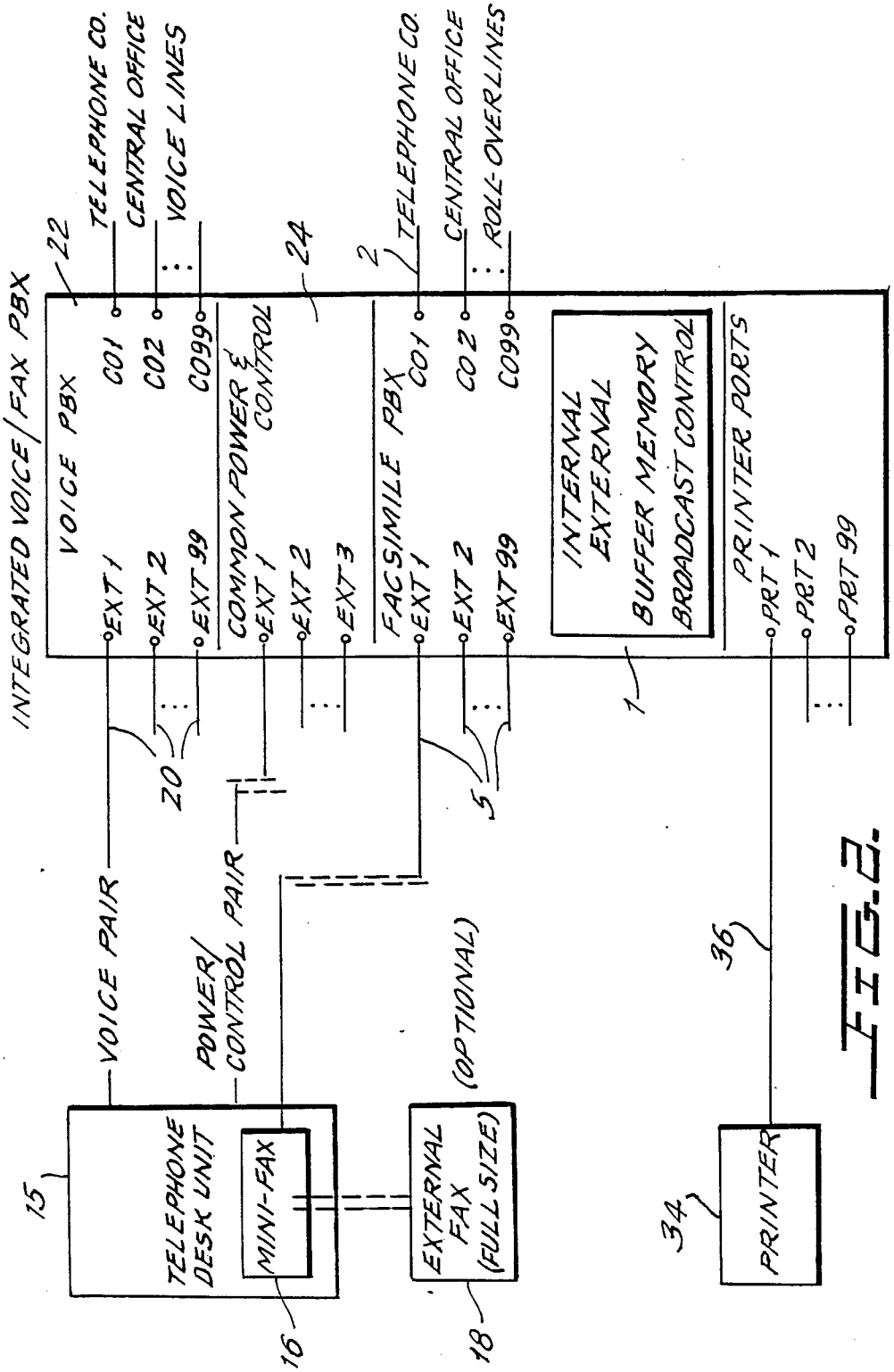
FIG. 2 is an overall block diagram of an office system using the facsimile PBX of the present invention.

As shown in FIG. 2, the invention can optionally be employed on the company (internal) side with combination multiline telephone system and integrated facsimile machines 15 designed for the small to medium sized office. These combination telephone/facsimile machines 15 are modular in nature and interchangeable, with various sizes (i.e. widths) of facsimile mechanisms ranging from a small modular unit 16 (which fits inside the telephone desk unit itself) to a full sized facsimile machine 18 which can be coupled externally to the desk unit. These machines can communicate through the facsimile PBX interface 1 over the office telephone intercom system, allowing notes and memos to be sent silently and instantly, directly from desk to desk, with simultaneous voice communication over voice lines 20. They can also be operated for communication to the outside world through the facsimile PBX interface 1 of the invention, with simultaneous voice communication through voice PBX 22. The various units of the system are powered by a common power and control unit 24.

The units are interchangeable and modular, so that they can be readily attached or detached to change the configuration of different work stations at any time, thus offering the advantage of flexibility in the economy to users. The modularity enables users to couple a fax unit to any phone 15 in the system, thus allowing the individual to send or receive facsimiles to any individual station in the system or any group of stations, or to all stations simultaneously. As shown in greater detail in FIG. 3, the mini fax unit 16 is small enough to fit within the phone 15 itself, thus allowing the user to insert small messages, such as memo notes 28, into a fax input/output slot 30 in the phone 15. The telephone 15 is preferably a multi-line speaker phone as shown with a slot at the top (not shown) provided for simple insertion of the modular mini fax 16.

As shown in FIGS. 1 and 2, the invention is also provided with printer ports 32 for direct high speed output to any of a plurality of laser jet printers 34 over printer lines 36. The printer ports 32 can either be parallel or serial ports depending on the type of printers employed. Use of this feature will provide a much higher quality output than is available from current facsimile machines, which print on thermal paper. The print-out will also be a permanent copy, as opposed to a thermal paper print-out, which fades away after a few years. As shown in the drawings, the printer ports 32 are modular: thus additional ports can be added to the system as the volume of facsimiles increases. Since laser printers are faster than facsimile machines printers, direct print-out will also relieve the memory requirement for the system.

Although the present invention has been described in connection with a preferred embodiment thereof, many other variations and modifications will now become apparent to those skilled in the art without departing from the scope of the invention. It is preferred, therefore, that the present invention be limited not by the specific disclosure herein, but only by the appended claims.

I claim:

1. A system for interfacing between facsimile telephone lines and internal office facsimile machines, comprising:

(a) means for transmitting outgoing facsimile transmissions and receiving incoming facsimile transmissions over a plurality of said facsimile telephone lines, including roll-over means for switching said outgoing and incoming facsimile transmissions from a first of said facsimile telephone lines to other of said facsimile telephone lines if said first facsimile telephone line is busy receiving or transmitting another facsimile transmission;

(b) memory means for storing a plurality of outgoing and incoming facsimile transmissions; and (c) means for controlling said system to store said outgoing facsimile transmissions in said memory means before being transmitted if all facsimile telephone lines are busy or if the outgoing facsimile is intended to be transmitted at a later time, and to store said incoming facsimile transmissions in said memory means after being received if all internal office facsimile machines are busy or if the incoming facsimile transmission is to be printed at a later time.

2. A system as recited in claim 1, wherein said memory means comprises a hard disc memory.

3. A system as recited in claim 1, wherein said memory means comprises an electronic RAM memory.

4. A system as recited in claim 1, wherein means for controlling comprises a microcomputer which executes system program control instructions.

5. A system as recited in claim 4, wherein said system program control instructions are reprogrammable to adjust for changes in transmission standards.

6. A system as recited in claim 1, further comprising passwords assigned to individual recipients at their respective facsimile terminals which must be entered in order for said recipients to access and receive their respective transmissions from said memory means.

7. A system as recited in claim 1, further comprising at least one printer port connected to said memory means for direct print-out of facsimile transmissions.

8. A system as recited in claim 1 which is modular in design, comprising a plurality of insertable cards, wherein additional cards are added to expand system capability.

9. A system as recited in claim 1 which is modular in design, wherein said memory means comprises a plurality of cards, wherein additional cards are added to expand memory capacity.

10. A system as recited in claim 1, wherein said internal office facsimile machines are miniature size and are incorporated into telephone desk units.

11. A system as recited in claim 10, wherein at least one of said telephone desk units with miniature facsimile machines is coupled to a respective full-sized facsimile machine.

12. A method for interfacing facsimile telephone lines and internal office facsimile machines, comprising the steps of:

(a) transmitting outgoing facsimile transmissions and receiving incoming facsimile transmissions over a plurality of said facsimile telephone lines, including rollover said outgoing and incoming facsimile transmissions from a first of said facsimile telephone lines to other of said facsimile telephone lines if said first facsimile telephone line is busy receiving or transmitting another facsimile transmission; and (b) storing said outgoing facsimile transmissions in a memory before being transmitted if all facsimile telephone lines are busy or if the outgoing facsimile is intended to be transmitted at a later time, and storing said incoming facsimile transmissions in said memory after being received if all internal office facsimile machines are busy or if the incoming facsimile transmission is to be printed at a later time.

13. A method as recited in claim 12, wherein said incoming facsimile transmissions, after being stored in memory, are broadcast to a plurality of said internal office facsimile machines.

14. A method as recited in claim 13, wherein said incoming facsimile transmissions, after being stored in memory, are sent to a selected one of said internal office facsimile machines based on a destination code transmitted with said facsimile transmission.

15. A method as recited in claim 14, wherein said outgoing facsimile transmissions, after being stored in memory, are broadcast to a plurality of destinations.

* * * * *